(12) United States Patent
Ohashi

(10) Patent No.: US 10,024,449 B2
(45) Date of Patent: Jul. 17, 2018

(54) PLANETARY GEAR TORQUE LIMITING STRUCTURE FOR A REGULATING VALVE

(71) Applicant: Azbil Corporation, Tokyo (JP)

(72) Inventor: Tomofumi Ohashi, Tokyo (JP)

(73) Assignee: Azbil Corporation, Tokyo (JP)

( * ) Notice: Subject to any disclaimer, the term of this patent is extended or adjusted under 35 U.S.C. 154(b) by 0 days.

(21) Appl. No.: 15/298,840

(22) Filed: Oct. 20, 2016

(65) Prior Publication Data

US 2017/0114919 A1    Apr. 27, 2017

(30) Foreign Application Priority Data

Oct. 23, 2015 (JP) ................................ 2015-208852

(51) Int. Cl.
    *F16K 31/04*       (2006.01)
    *F16H 1/28*        (2006.01)
    (Continued)

(52) U.S. Cl.
    CPC ............. *F16K 31/045* (2013.01); *F16H 1/28* (2013.01); *F16H 35/10* (2013.01); *F16K 31/048* (2013.01);
    (Continued)

(58) Field of Classification Search
    CPC ...... F16K 31/53; F16K 31/535; F16K 31/088; F16K 31/086; F16K 31/047;
    (Continued)

(56) References Cited

U.S. PATENT DOCUMENTS

| 272,940 A | * | 2/1883 | Bergh | ..................... F16H 55/18 403/295 |
| 3,633,441 A | * | 1/1972 | Hicks | .................... F16H 1/2809 475/334 |

(Continued)

FOREIGN PATENT DOCUMENTS

| JP | 2007-177405 A | 7/2007 |
| JP | 2010-255833 A | 11/2010 |

(Continued)

OTHER PUBLICATIONS

Korean Intellectual Property Office, "Office Action," issued in KR Patent Application No. KR 10-2016-0137745, which is a Korean counterpart of U.S. Appl. No. 15/298,840, dated Apr. 2, 2018, 7 pages (4 pages of English Translation of Korean Office Action, 3 pages of Original Korean Office Action).

*Primary Examiner* — Matthew W Jellett
(74) *Attorney, Agent, or Firm* — Amster, Rothstein & Ebenstein LLP

(57) ABSTRACT

A setting/operating device for operating a valve stem of a regulating valve, including: a sun gear that rotates upon reception of a rotational force from a drive motor; a fixed internal gear fixedly disposed to surround the sun gear and having teeth on an inner peripheral surface; a plurality of planetary gears disposed between the sun gear and the fixed internal gear that rotate in engagement with the sun gear and the fixed internal gear while revolving around the sun gear; a movable internal gear rotatably disposed coaxially with the fixed internal gear, having teeth that engage the planetary gear on an inner peripheral surface; and an output shaft coupled to the movable internal gear and configured to rotate the valve stem of the regulating valve, wherein the planetary (Continued)

gears have a torque limit structure that restricts power transmission when a torque exceeding a certain level is applied.

5 Claims, 15 Drawing Sheets

(51) Int. Cl.
*F16H 35/10* (2006.01)
*F16K 31/08* (2006.01)

(52) U.S. Cl.
CPC ...... *F16K 31/08* (2013.01); *F16H 2001/2881* (2013.01)

(58) Field of Classification Search
CPC ........ F16K 31/048; F16H 1/28; F16H 1/2809; F16H 1/2863; F16H 13/10; F16H 13/12; F16H 13/14; F16H 2001/2881; F16H 2001/289; F16H 55/18
USPC ............. 251/248, 250.5, 65, 79, 81; 74/440, 74/DIG. 4; 475/183, 347, 903
See application file for complete search history.

(56) References Cited

U.S. PATENT DOCUMENTS

| | | | | |
|---|---|---|---|---|
| 3,757,608 A | * | 9/1973 | Willner | F16H 1/2809 475/347 |
| 4,882,943 A | * | 11/1989 | Pipon | B60N 2/2251 74/409 |
| 5,293,107 A | * | 3/1994 | Akeel | B25J 9/08 310/83 |
| 7,815,542 B2 | * | 10/2010 | Dec | F16H 3/60 192/69.91 |
| 8,397,757 B2 | * | 3/2013 | Kannoo | F16K 11/074 137/625.43 |
| 8,584,359 B1 | * | 11/2013 | Bowman | F16H 1/46 29/893.1 |
| 2012/0068098 A1 | | 3/2012 | Arai | |

FOREIGN PATENT DOCUMENTS

| | | |
|---|---|---|
| JP | 2012-067835 A | 4/2012 |
| JP | 2014-016222 A | 1/2014 |

* cited by examiner

PLANETARY GEAR TORQUE LIMITING STRUCTURE FOR A REGULATING VALVE

CROSS-REFERENCE TO RELATED APPLICATION

The present application claims the benefit of and priority to Japanese Patent Application No. 2015-208852, filed on Oct. 23, 2015, the entire contents of which are incorporated by reference herein.

TECHNICAL FIELD

The present disclosure relates to a setting/operating device for operating a valve stem of a regulating valve and relates, for example, to a setting/operating device for operating a valve stem of a rotary-type regulating valve.

BACKGROUND

In the related art, in a chemical plant or the like, a regulating valve is used for process control of a flow rate. A valve opening of the regulating valve is adjusted by a setting/operating device (hereinafter, also referred to as an "actuator") that operates a valve stem of a regulating valve based on a control signal from a positioner.

In general, in the case of a rotary-type regulating valve such as a butterfly valve, a valve member of the regulating valve may be opened and closed by a force of a fluid that is under control. For example, in a case of an electric actuator, when an electric supply to the actuator is stopped due to an interruption of electric service or the like within a plant, a retaining force for a drive motor in an interior of the actuator is lost and an opening degree of the regulating valve may not be maintained.

Therefore, a power transmitting mechanism that drives the valve stem of the actuator requires a self-lock function that prevents the valve stem from operating even when no electric power is supplied. As the power transmitting mechanism that realizes the self-lock function, as disclosed in PTL 1 and PTL 2 described below for example, a paradox planetary gear mechanism is well known.

PTL 3 describes a setting/operating device in which the planetary gear mechanism is employed as a power transmitting mechanism for a valve stem.

CITATION LIST

Patent Literature

[PTL 1] JP-A-2007-177405
[PTL 2] JP-A-2010-255833
[PTL 3] JP-A-2014-16222

SUMMARY

The present inventor has studied about an employment of the paradox planetary gear mechanism in the power transmitting mechanism in an actuator for realizing an electric actuator which achieves lower cost and compact profile. As a result of the study, the following problems are revealed.

In the case where the paradox planetary gear mechanism is applied as a power transmitting mechanism for a valve stem in an electric actuator, even when a force is applied to the valve stem of a regulating valve by a force of a fluid that is controlled by the regulating valve, the valve stem is fixed by a self-lock function of the paradox planetary gear mechanism, so that a valve member is prevented from opening and closing.

However, if an excessive torque increase occurs abruptly due to foreign substances or the like caught by the regulating valve while the regulating valve is being driven, for example, a movable internal gear and a planetary gear which constitute the paradox planetary gear mechanism are subjected to an impact force caused by the torque increase, which may lead to damage to the teeth of the gears.

As one of measures for solving the above-described problems, for example, the disclosure in the above-described PTL 3 may be employed. In the electric actuator in which the planetary gear mechanism disclosed in PTL 3 is employed, a coil spring is provided as an elastic member between an outer peripheral surface of an internal gear of the planetary gear mechanism and an inner peripheral surface of a case, and a rotation of the internal gear is restricted until a torque of a predetermined value or higher is applied by the coil spring to a carrier that holds the planetary gear.

However, the technology disclosed in PTL 3 has problems that there is a fear of variation of input and output characteristics of the setting/operating device depending on the torque, and feedback control of the opening degree and a correction process are required, so that a system configuration of the regulating valve as a whole becomes complicated.

In view of such problems described above, it is an object of the invention to provide a setting/operating device including a paradox planetary gear mechanism in which damage to the gears is substantially reduced while restricting complication of a system configuration of a regulating valve as a whole.

A setting/operating device (100) for operating a valve stem of a regulating valve according to the invention includes: a sun gear (3) that rotates upon reception of a rotational force from a drive motor; a fixed internal gear (5) fixedly disposed in a form of surrounding the sun gear and having teeth on an inner peripheral surface thereof; a plurality of planetary gears (4, 14, 24, 34) disposed between the sun gear and the fixed internal gear that rotate in engagement with the sun gear and the fixed internal gear while revolving around the sun gear; a movable internal gear (6) disposed coaxially with the fixed internal gear, having teeth that come into engagement with the planetary gears on an inner peripheral surface thereof and provided so as to be rotatable; and an output shaft coupled to the movable internal gear and configured to rotate the valve stem of the regulating valve, wherein the planetary gears have a torque limit structure that restricts power transmission when a torque exceeding a certain level is applied in the direction of rotation.

In the setting/operating device described above, each of the planetary gears includes a first gear portion that engages the fixed internal gear and a second gear portion coupled coaxially to the first gear portion and configured to engage the movable internal gear, and the torque limit structure described above may be a structure provided between the first gear portion and the second gear portion and configured in such a manner that when a torsional moment exceeding a predetermined value is applied to one of the first gear portion and the second gear portion, the one runs idle with respect to the other.

In the setting/operating device described above, the first gear portion and the second gear portion may be coupled to each other by a projection portion formed on one of the first gear portion and the second gear portion in a direction of the axis of rotation of the planetary gear (or an axial direction thereof), the projection portion being inserted into a concave portion formed on the other.

In the above description described above, as an example, reference numerals in drawings corresponding to components of the invention are designated in parentheses.

According to the description given above, the invention realizes a setting/operating device having a paradox planetary gear mechanism in which damage to the gears is substantially reduced.

DETAILED DESCRIPTION

Hereinafter, embodiments of the invention will be described with reference to the drawings.

Embodiment 1

Figure 1:
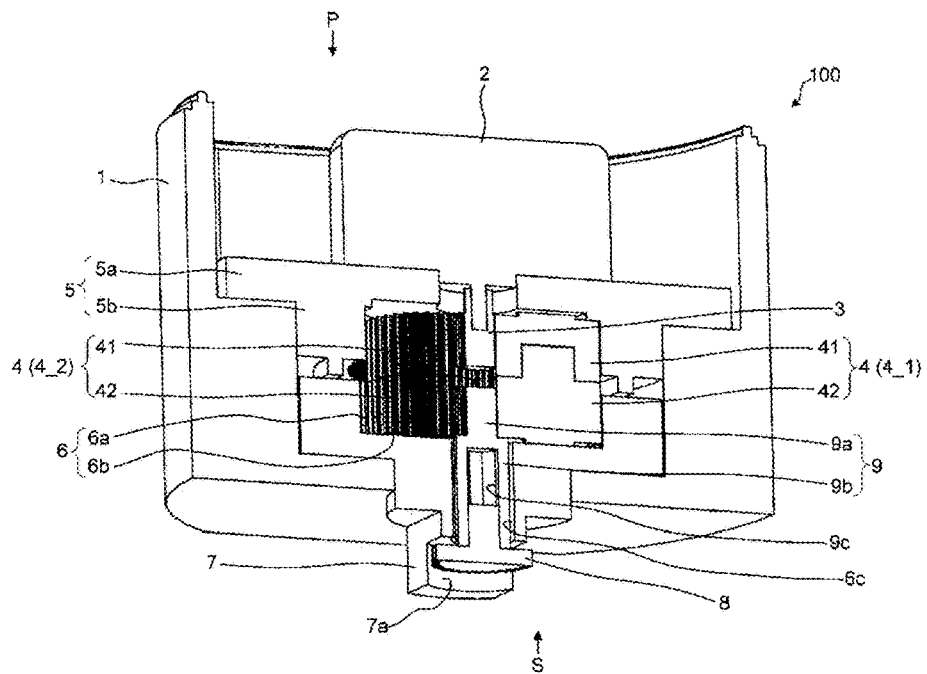
FIG. 1 is a cross-sectional perspective view illustrating a principal portion of a setting/operating device according to Embodiment 1.

FIG. 1 is a cross-sectional perspective view illustrating a principal portion of a setting/operating device according to Embodiment 1.

The setting/operating device 100 according to Embodiment 1 illustrated in FIG. 1 is a device configured to operate a regulating valve used in process control of a flow rate in a plant, or the like, and is configured to control a valve opening of the regulating valve by operating a valve stem of the regulating valve in accordance with an operation signal supplied from a positioner provided externally. For example, the setting/operating device 100 is an electric actuator configured to operate a rotary-type regulating valve, such as a butterfly valve.

The setting/operating device 100 according to Embodiment 1 includes a paradox planetary gear mechanism as a power transmitting mechanism that operates the valve stem of the regulating valve, and includes a self-lock function which prevents the valve stem from operating even when no electric power is supplied to the electric motor. The setting/operating device 100 has a function that allows a manual operation of the valve stem to fix the valve stem at a given valve opening even when no power is supplied to the electric motor.

In addition, the setting/operating device 100 includes a structure for preventing the gears of the paradox planetary gear mechanism from becoming damaged by absorbing a force applied from the regulating valve (valve stem) side.

A specific structure for realizing the above-described functions in the setting/operating device 100 will be described in detail below.

Figure 2:
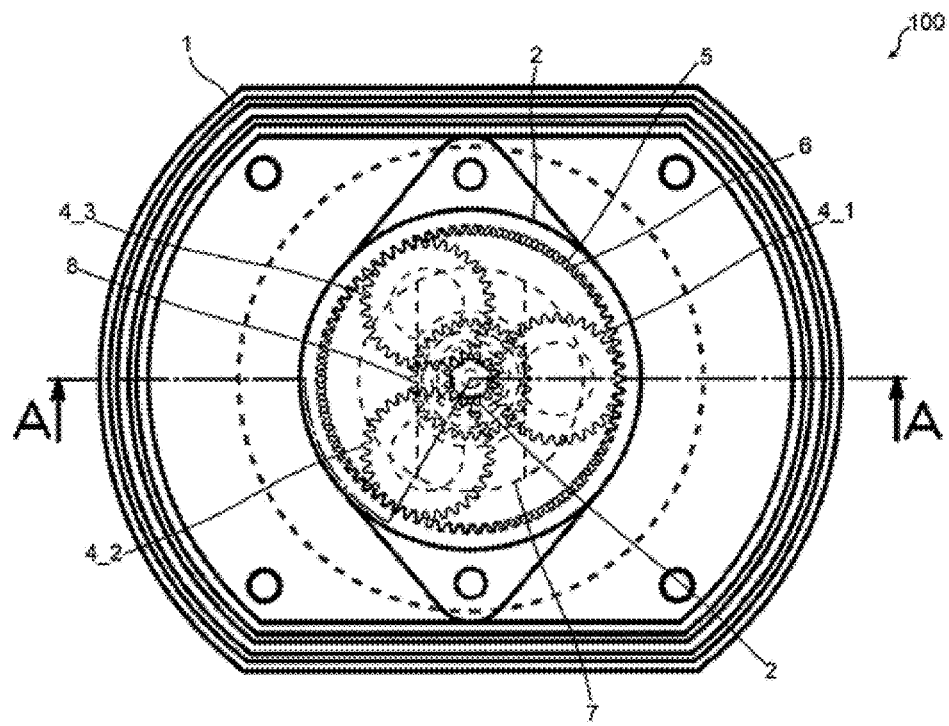
FIG. 2 is a plan view illustrating a principal portion of the setting/operating device according to Embodiment 1.

FIG. 2 is a plan view illustrating a principal portion of a setting/operating device according to Embodiment 1.

Figure 3:
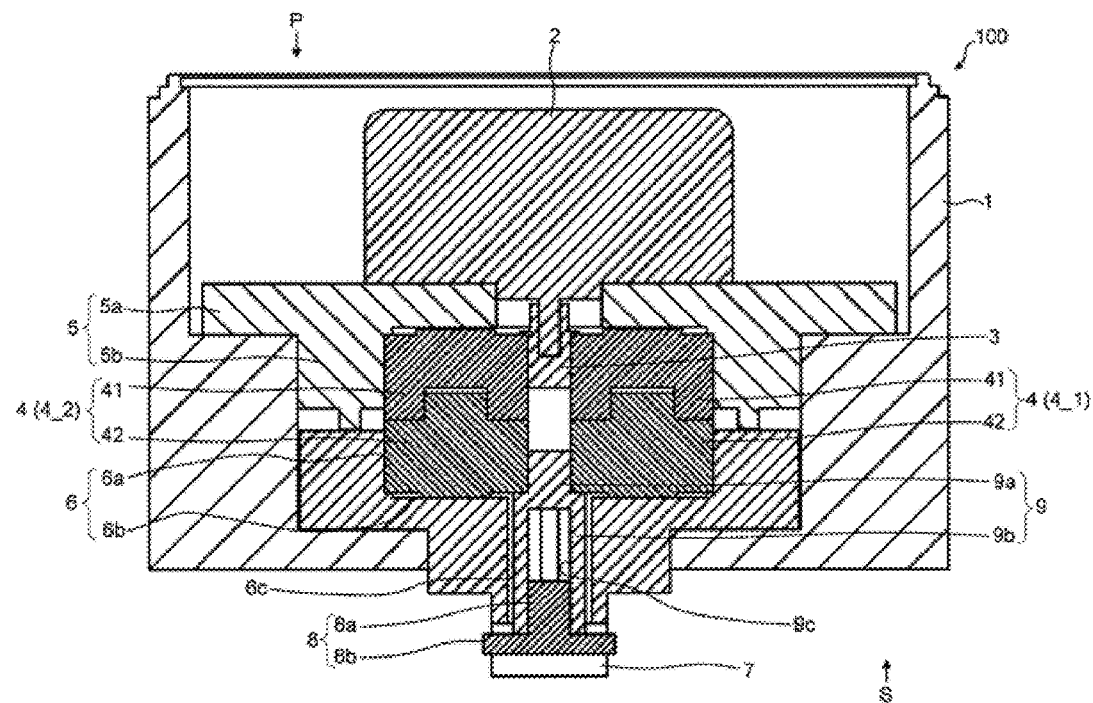
FIG. 3 is a cross-sectional view illustrating a principal portion of the setting/operating device according to Embodiment 1.

FIG. 3 is a cross-sectional view illustrating a principal portion of the setting/operating device according to Embodiment 1.

FIG. 2 illustrates a planar structure of a principal portion of a setting/operating device 100 when viewed from a direction P in FIG. 1, and FIG. 3 illustrates a cross section of the setting/operating device 100 taken along the line A-A in FIG. 2. In FIGS. 2 and 3, part of the components of the setting/operating device 100 is omitted in order to clarify positional relationships among the gears which constitute a power transmitting mechanism of the setting/operating device 100.

As illustrated in FIGS. 1 to 3, the setting/operating device 100 includes a housing 1, a drive motor 2, a sun gear 3, planetary gears 4_1 to 4_3, a fixed internal gear 5, a movable internal gear 6, an output shaft 7, a dial 8, and a manual operating gear 9.

Although the setting/operating device 100 also includes an electronic circuit portion and a power supply unit for controlling the rotation of the drive motor 2 based on an operation signal supplied from a positioner, illustration of these components is omitted in FIGS. 1 to 3.

The housing 1 is a container for accommodating the components of the setting/operating device 100 and is formed of, for example, a metallic material. FIG. 1 illustrates a case where a lid that covers an upper portion (P-side in FIG. 1) of the housing 1 is removed. However, the lid that covers the upper portion of the housing 1 is installed in a final product form (for example, as shown in FIG. 3).

The drive motor 2 is an electric motor that is controlled by the electronic circuit portion (not illustrated) described above.

The sun gear 3 is a gear that is coupled to the rotation shaft of the drive motor 2 and is a gear that rotates (rotates about its own axis) upon reception of a rotational force of the rotation shaft.

The fixed internal gear 5 is a gear that is fixedly disposed in a form of surrounding the sun gear 3 and has teeth on an inner peripheral surface thereof (which may be annular teeth or teeth on an annular surface to form an annular gear, annular gear surface, or annular gear portion). Specifically, the fixed internal gear 5 includes a plate 5a configured to support the drive motor 2 and rotatably hold the planetary gears 4 (4_1 to 4_3) in the direction P, and a gear portion 5b that engages the periphery of a first gear portion 41 of the planetary gears 4_1 to 4_3.

Although the plate 5a and the gear portion 5b may be separate components, a reduction in number of components is achieved by forming these members integrally.

The planetary gears 4_1 to 4_3 (also referred to as "planetary gear 4," "planetary gear 14," "planetary gear 24," or "planetary gear 34" when they are collectively expressed) are gears which are disposed between the sun gear 3 and the fixed internal gear 5 and are rotated in engagement with the sun gear 3 and the fixed internal gear 5 while revolving around the sun gear 3.

The planetary gear 4 has a torque limit structure which restricts power transmission between the sun gear 3 and the movable internal gear 6 when a torque of at least a certain level is applied in a direction of rotation. Specifically, each of the planetary gears 4_1 to 4_3 has a structure including a first gear portion 41 and a second gear portion 42 arranged coaxially with the first gear portion 41, the first gear portion 41 and the second gear portion 42 being coupled to each other.

The first gear portion 41 is a gear configured to engage the sun gear 3 and the fixed internal gear 5. The second gear portion 42 is a gear that is coupled coaxially with the first gear portion 41 and is configured to engage the manual operating gear 9 and the movable internal gear 6. Here, the first gear portion 41 and the second gear portion 42 have the same diameter and the number of teeth.

The first gear portion 41 and the second gear portion 42 are coupled in such a manner that when a torsional moment exceeding a predetermined value is applied to one of the first gear portion 41 and the second gear portion 42, the one runs idle with respect to the other. Detailed description of the first gear portion 41 and the second gear portion 42 will be described later.

The movable internal gear 6 is disposed coaxially with the fixed internal gear 5, has teeth that come into engagement with the planetary gear 4 (second gear portion 42) on the inner peripheral surface thereof (which may be annular teeth or teeth on an annular surface to form an annular gear, annular gear surface, or annular gear portion), and is provided so as to be rotatable. Specifically, the movable internal gear 6 includes a gear portion 6a that engages the second gear portion 42 and a bottom portion 6b that rotatably supports the planetary gear 4 (the second gear portion 42). The bottom portion 6b includes a through-hole 6c that is formed in a direction of an axis of rotation (which may also be referred to as an "axial direction") of the movable internal gear 6.

An output shaft 7 is a component that is coupled to the movable internal gear 6 and is configured to rotate the valve stem of the regulating valve. As illustrated in FIGS. 1 and 3, the output shaft 7 has the same axis of rotation as the movable internal gear 6 and is formed integrally with the movable internal gear 6.

The dial 8 is a component that serves as manually operating means configured to apply an external force to the sun gear 3 or the planetary gear 4 as a rotational force. The manual operating gear 9 is a gear that is coupled to the dial 8 and is configured to transmit a force applied thereto via the dial 8 to the planetary gear 4. Detailed description of the manual operating gear 9 and the dial 8 will be described later.

The sun gear 3, the planetary gear 4, the fixed internal gear 5, and the movable internal gear 6 are formed of, for example, a resin material, such as plastic and a metallic material. The sun gear 3, the planetary gear 4, the fixed internal gear 5, and the movable internal gear 6 constitute one paradox planetary gear mechanism. The paradox planetary gear mechanism will be described below in detail.

Figure 4:
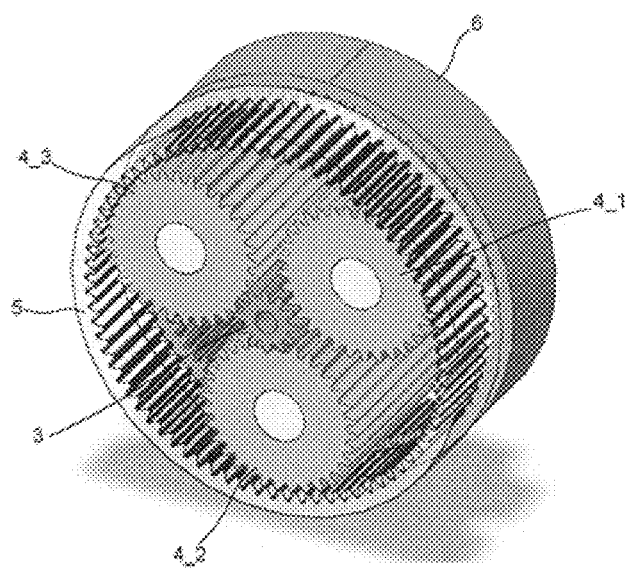
FIG. 4 is a perspective view illustrating a structure of a paradox planetary gear mechanism including a sun gear, planetary gears, a fixed internal gear, and a movable internal gear.

FIG. 4 is a perspective view illustrating a structure of the paradox planetary gear mechanism including the sun gear 3, the planetary gear 4, the fixed internal gear 5, and the movable internal gear 6.

As illustrated in FIG. 4, the planetary gears 4_1 to 4_3 are disposed in engagement with the sun gear 3 disposed at a central portion of the paradox planetary gear mechanism. In addition, the fixed internal gear 5 configured to engage part of the areas of the planetary gear 4 and configured to guide the rotation of the planetary gears 4_1 to 4_3 is fixedly disposed in the periphery of the planetary gears 4_1 to 4_3, and the movable internal gear 6, which engages other areas of the planetary gear 4 and is configured to be rotatable, is also disposed therein.

In the paradox planetary gear mechanism described above, the sun gear 3 rotates upon reception of a rotational force from a rotation shaft of the drive motor 2, which in turn causes the planetary gears 4_1 to 4_3 to rotate (revolve) along the fixed internal gear 5 while rotating. The movable internal gear 6 rotates upon reception of the rotational force of the planetary gears 4_1 to 4_3. The output shaft 7 can be rotated by a significantly reduced rotational force of the drive motor 2 by coupling the output shaft 7 (valve stem) to the movable internal gear 6.

Since the paradox planetary gear mechanism described above has a self-lock function, the output shaft 7 (valve stem), which is coupled to the movable internal gear 6, cannot be rotated even when a force is applied externally to the output shaft 7, or a large force is required to rotate the output shaft 7. Therefore, even when the power supply to the drive motor 2 is interrupted due to an interruption of electric service, the valve opening of the regulating valve may be substantially fixed, so that the self-lock function of the regulating valve is achieved.

As described above, the setting/operating device 100 may realize the self-lock function of the regulating valve by the paradox planetary gear mechanism that includes the sun gear 3, the planetary gear 4, the fixed internal gear 5, and the movable internal gear 6.

In addition, the paradox planetary gear mechanism of the present disclosure has a structure that rotates the movable internal gear 6 not by the drive motor 2, but manually. The structure of the paradox planetary gear mechanism will be described below in detail.

As illustrated in FIGS. 1 and 3, the manual operating gear 9 includes a gear portion 9a and a supporting portion 9b.

The gear portion 9a has, for example, the same diameter and the same number of teeth as the sun gear 3 and is disposed coaxially with the sun gear 3 so as to engage each of the second gear portions 42 of the planetary gears 4_1 to 4_3.

The supporting portion 9b supports the gear portion 9a, and is inserted into a through-hole 6c of the movable internal gear 6. The supporting portion 9b is integrally formed with the gear portion 9a, for example. Specifically, the supporting portion 9b is accommodated in the through-hole 6c of the movable internal gear 6, and partly projects to the outside of the housing 1 together with the movable internal gear 6. The supporting portion 9b is formed into a cylindrical shape opening at one end thereof and bottomed on the other end. Specifically, an end portion of the supporting portion 9b on the side projecting from the housing 1 is provided with a hole 9c formed in the direction of an axis of rotation of the gear portion 9a.

A projection 8a of the dial 8 is inserted into the hole 9c, and the projection 8a of the dial 8 fits into the hole 9c. Accordingly, the manual operating gear 9 and the dial 8 are coupled.

Here, the hole 9c and the projection 8a of the dial 8 are formed into, for example, a polygonal shape (for example, a hexagonal shape) in plan view.

Since the manual operating gear 9 and the dial 8 are coupled as described above, a rotational force can be applied directly to the planetary gear 4 not by the drive motor 2 and the sun gear 3 but by rotating the dial 8 manually, for example. Accordingly, even in a state in which the drive motor 2 is stopped, the movable internal gear 6 can be rotated via the planetary gear 4 by operating the dial 8 manually and rotating the manual operating gear 9, and thus the valve stem may be rotated to a position that achieves a desired valve opening. In addition, as described above, since the paradox planetary gear mechanism is employed as the power transmitting mechanism of the setting/operating device 100, the valve stem can be fixed at the position described above by the self-lock function of the paradox planetary gear mechanism after the valve stem is rotated to a desired position by the dial 8.

Subsequently, the position where the dial 8 is formed will be described.

Figure 5:
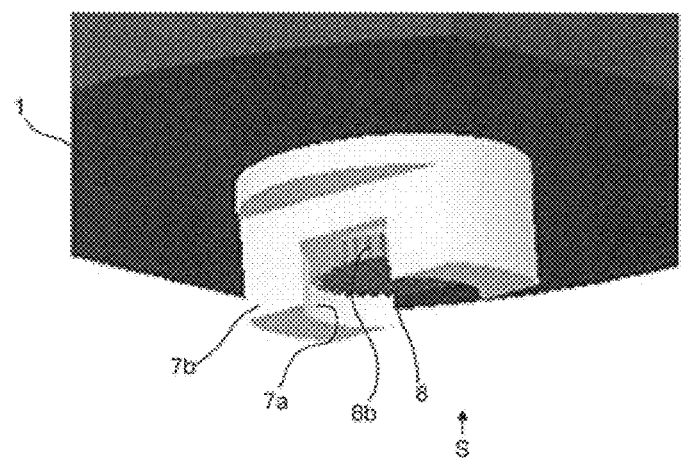
FIG. 5 is a perspective view illustrating a peripheral portion of a dial in the setting/operating device according to Embodiment 1 in an enlarged scale.

FIG. 5 is a perspective view illustrating a peripheral portion of a dial 8 in the setting/operating device 100 according to Embodiment 1 in an enlarged scale.

Figure 6:
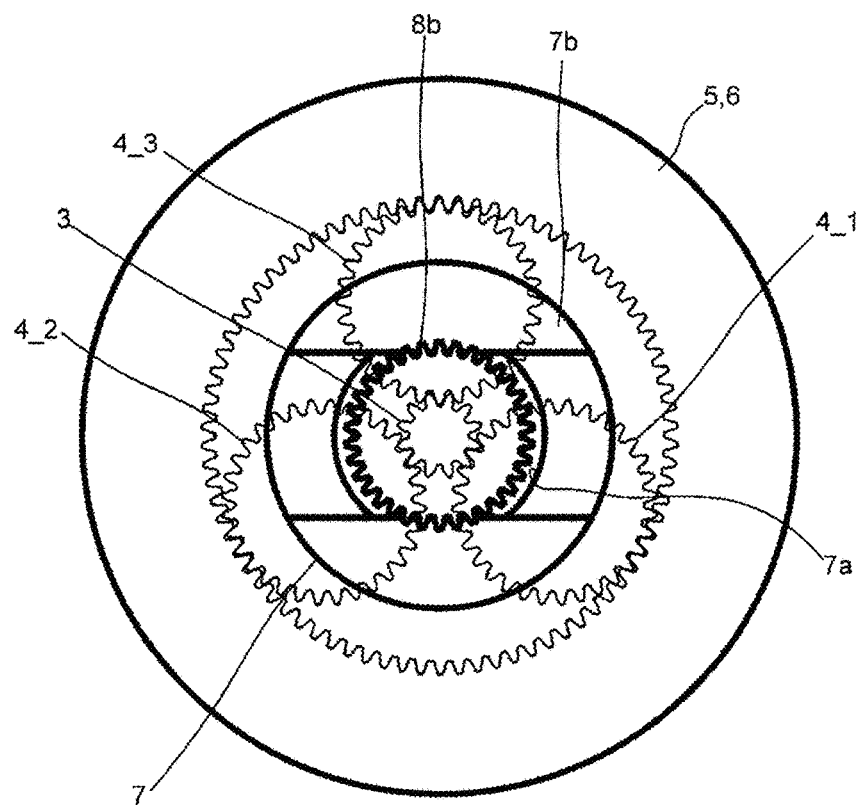
FIG. 6 is a plan view illustrating the setting/operating device according to Embodiment 1 when viewed from a valve stem side.

FIG. 6 is a plan view illustrating the setting/operating device 100 according to Embodiment 1 viewed from the valve stem side (e.g., in direction S of FIGS. 1, 3, and 5).

As illustrated in FIGS. 5 and 6, the output shaft 7 is formed into a rod shape (for example, cylindrical shape), and includes a cut-away portion 7b which is formed by cutting away part of an outer peripheral portion of the output shaft 7 in a radial direction and a concave portion 7a formed at a central portion of the output shaft 7 in another radial direction. And as shown in FIGS. 5 and 6, output shaft 7 may comprise two opposing cut-away portions 7b (on opposite sides of output shaft 7) and corresponding two opposing concave portions 7a (on corresponding opposite sides of output shaft 7).

The dial 8 is disposed at the concave portion 7a of the output shaft 7. Specifically, as illustrated in FIG. 5, the dial 8 is disposed in such a manner that the center of the dial 8 is aligned with the center of the concave portion 7a in plan view, and part of an outer peripheral portion 8b of the dial 8 protrudes from the concave portion 7a toward the cut-away portion 7b in plan view.

With the output shaft 7 formed and the dial 8 disposed in the manner described above, even when the dial 8 is disposed coaxially with the sun gear 3 as illustrated in FIGS. 1 to 6, the output shaft 7 does not become an impediment to the operation of the dial 8, and thus manual operation of the valve stem can easily be performed.

Referring now to FIGS. 7 to 11, a structure of the planetary gear 4 will be described.

Figure 7:
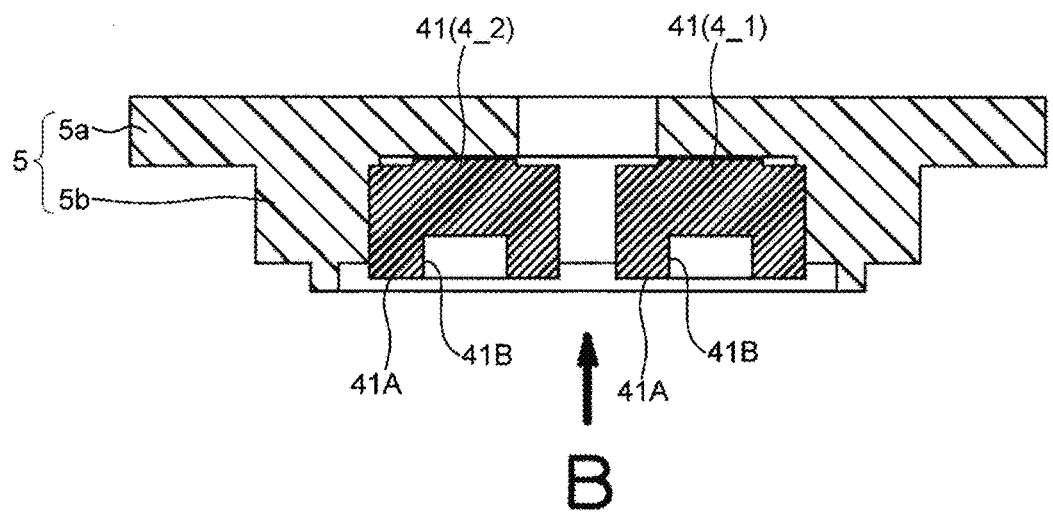
FIG. 7 is a drawing illustrating a cross-sectional structure of a first gear portion of the setting/operating device according to Embodiment 1.
Figure 8:
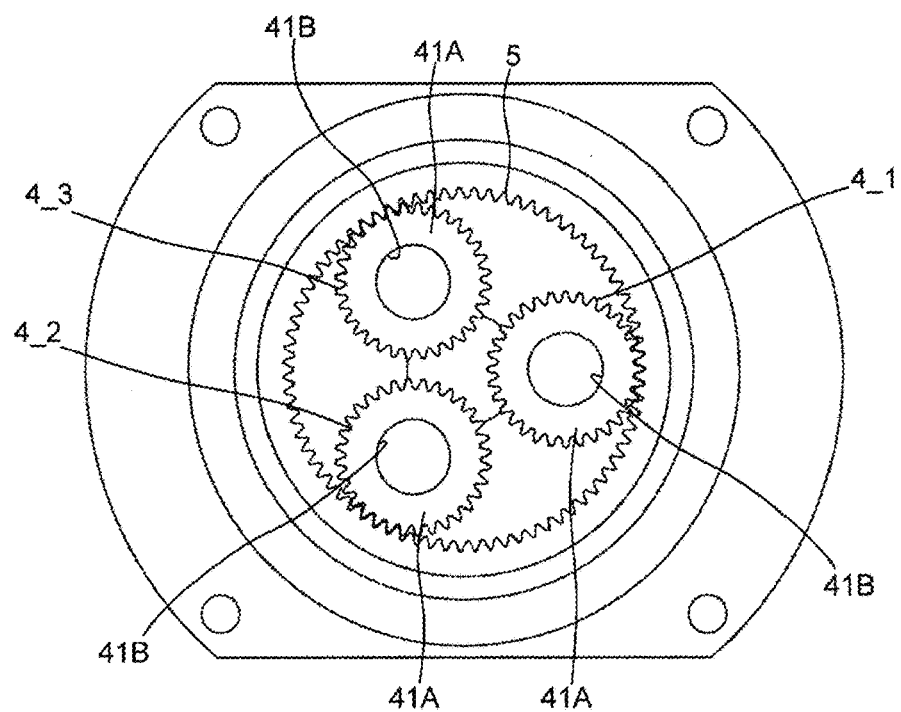
FIG. 8 is a drawing illustrating a planar structure of the first gear portion of the setting/operating device according to Embodiment 1.
Figure 9:
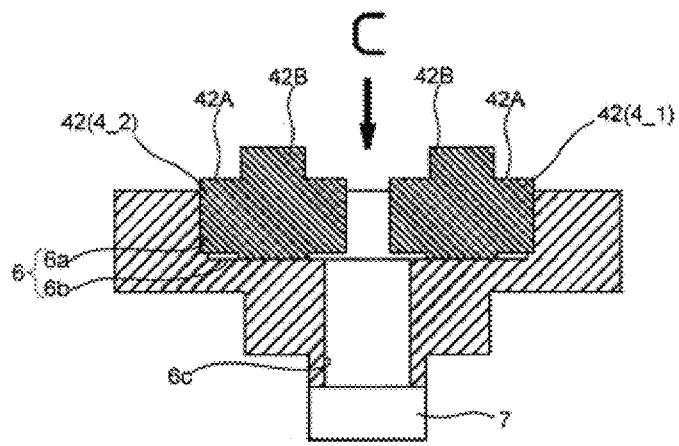
FIG. 9 is a drawing illustrating a cross-sectional structure of a second gear portion of the setting/operating device according to Embodiment 1.
Figure 10:
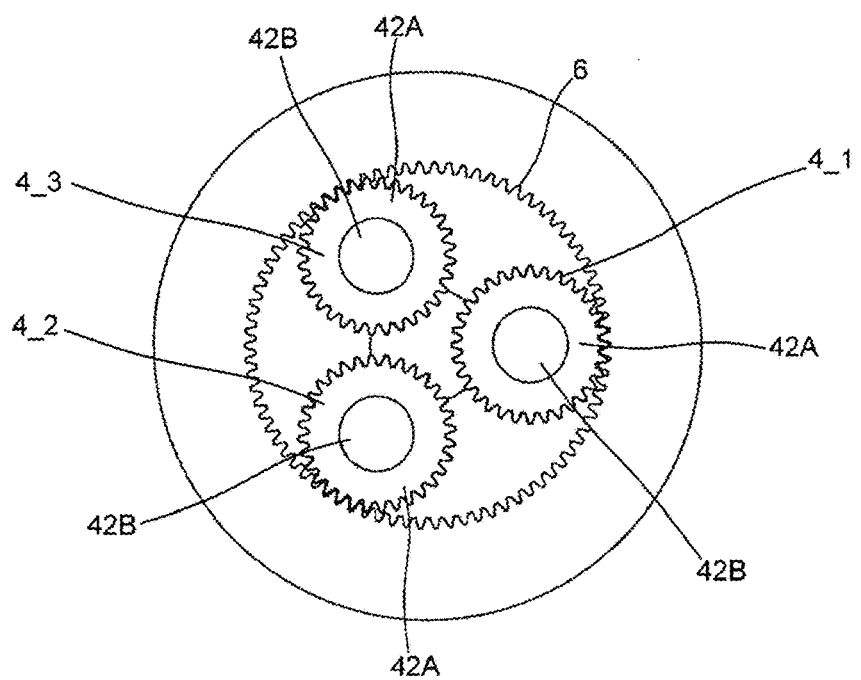
FIG. 10 is a drawing illustrating a planar structure of the second gear portion of the setting/operating device according to Embodiment 1.

FIG. 7 illustrates a cross-sectional structure in the periphery of the first gear portion 41 of the planetary gear 4, and FIG. 8 illustrates a planar structure of a portion in the periphery of the first gear portion 41 when viewing in a direction B in FIG. 7. FIG. 9 illustrates a cross-sectional structure in the periphery of the second gear portion 42 of the planetary gear 4, and FIG. 10 illustrates a planar structure of a portion in the periphery of the second gear portion 42 when viewing in a direction C in FIG. 9.

In FIGS. 7 to 10, only the portion in the periphery of the planetary gear 4 is illustrated and illustration of other portions in the setting/operating device 100 is omitted.

As described above, each of the planetary gears 4_1 to 4_3 includes a torque limit structure through which the first gear portion 41 and the second gear portion 42 are coaxially coupled.

Specifically, as illustrated in FIGS. 7 and 8, the first gear portion 41 includes a concave portion 41B formed on a surface 41A that comes into contact with the second gear portion 42 in a direction of the axis of rotation of the planetary gear 4. As illustrated in FIGS. 9 and 10, the second gear portion 42 includes a projection portion 42B (For example, a cylindrical projection) formed on the surface 42A that comes into contact with the first gear portion 41 in a direction of the axis of rotation of the planetary gear 4. The projection portion 42B is inserted and fitted into the concave portion 41B, so that the first gear portion 41 and the second gear portion 42 are coupled to each other. Accordingly, the planetary gear 4 having a torque limit function is achieved.

Figure 11:
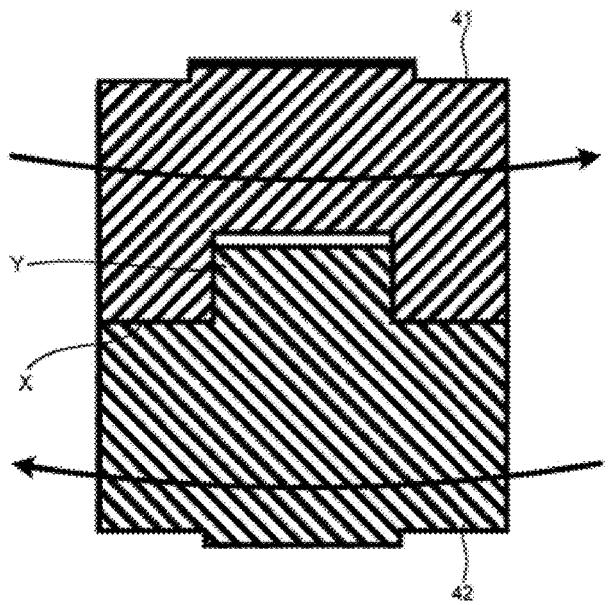
FIG. 11 is a cross-sectional view illustrating a coupling structure between the first gear portion and the second gear portion.

Here, a cut-off torque of the torque limit structure described above may be defined by a frictional force on a contact surface between the first gear portion 41 and the second gear portion 42. For example, as illustrated in FIG. 11, the cut-off torque may be defined by a frictional force of a contact surface Y between a side surface of the projection portion 42B and a side surface of the concave portion 41B. Alternatively, with the configuration in which the first gear portion 41 and the second gear portion 42 are pressed against the setting/operating device 100 from above and below (from a direction S and a direction P), the cut-off torque may be defined by a frictional force of a contact surface X between the surface 41A of the first gear portion 41 and a surface 42A of the second gear portion 42.

The magnitude of the frictional force on the above-described contact surface between the first gear portion 41 and the second gear portion 42 may be adjusted by, for example, providing the contact surface between the first gear portion 41 and the second gear portion 42 with roughness.

As described above, with the first gear portion 41 and the second gear portion 42 coupled to each other, when a torsional moment exceeding a predetermined value is applied to one of the first gear portion 41 and the second gear portion 42, a torque limit structure in which the one runs idle with respect to the other is achieved.

For example, a case where vibrations occur due to an irregular flow, such as pulsation of a fluid, in a pipe that is connected to the regulating valve will be considered. In this case, due to the vibrations described above, the valve member (valve plug) of the regulating valve is abruptly moved, and thus an impact force is applied to the valve stem. Accordingly, the impact force may in turn be applied from the valve stem to the fixed internal gear 5, the movable internal gear 6, and the planetary gear 4 of the setting/operating device 100 via the output shaft 7 due to a self-lock function of the paradox planetary gear mechanism. At this time, as illustrated in FIG. 11, forces in the opposite directions are applied to the second gear portion 42 that is in engagement with the movable internal gear 6 and the first gear portion 41 that is in engagement with the fixed internal gear 5, respectively. In other words, the planetary gear 4 is subjected to a twisting force (torsional moment).

When the torsional moment exceeds the cut-off torque defined by the frictional force on the contact surface between the first gear portion 41 and the second gear portion 42, the second gear portion 42 runs idle with respect to the first gear portion 41, so that transmission of an impact force from the second gear portion 42 to the first gear portion 41, the fixed internal gear 5, and the sun gear 3 may be cut off. Accordingly, an impact force applied to each of the gears which constitute the power transmitting mechanism in the setting/operating device 100 may be alleviated, and teeth of each of the gears can be prevented from becoming damaged.

Also, for example, even in the case where an excessive torque increase occurs abruptly due to foreign substances, or the like, caught by the regulating valve during driving of the regulating valve, the impact force applied to each of the gears which constitute the power transmitting mechanism within the setting/operating device 100 may be alleviated in the same manner as described above, so that the teeth of each of the gears can be prevented from becoming damaged.

In FIGS. 1 to 11, an example in which the second gear portion 42 is provided with the projection portion 42B and the first gear portion 41 is provided with the concave portion 41B has been described. However, the same effects and advantages as those described above may be achieved with the configuration in which the second gear portion 42 is provided with the concave portion and the first gear portion 41 is provided with the projection portion.

As described thus far, according to the setting/operating device 100 of Embodiment 1, the paradox planetary gear mechanism is employed as the power transmitting mechanism, and the manually operating means configured to apply the external force to the sun gear 3 of the paradox planetary gear mechanism as a rotational force is provided. Therefore, the dial 8 may be manually operated to rotate the movable internal gear 6 even in a state in which the drive motor 2 is stopped due to reasons such as an interruption of electric service, for example. Also, since Embodiment 1 does not have a structure in which the self-lock function of the paradox planetary gear mechanism is released as in the related art described above, the valve stem may be fixed after the operation of the dial 8. In other words, according to the setting/operating device 100 of Embodiment 1, the manual operation of the valve stem is enabled while realizing the self-lock function of the regulating valve.

According to the setting/operating device 100 of Embodiment 1, the impact force applied to each of the gears which constitute the paradox planetary gear mechanism may be alleviated with the torque limit structure of the planetary gear 4, so that each of the gears can be prevented from becoming damaged.

Specifically, with the configuration in which the planetary gear 4 is composed of the first gear portion 41 engaging the fixed internal gear 5 and the second gear portion 42 coaxially coupled to the first gear portion 41 and engaging the movable internal gear 6, when a torsional moment exceeding the cut-off torque defined by a frictional force on the contact surface between the first gear portion 41 and the second gear portion 42 is applied to one of the first gear portion 41 and the second gear portion 42, the one can run idle with respect to the other, so that transmission of an impact force applied to each of the first gear portion 41, the second gear portion 42, the fixed internal gear 5, and the sun gear 3 may be cut off from one another. Accordingly, the impact force applied to each of the gears which constitute the paradox planetary gear mechanism is alleviated, so that each of the gears can be prevented from becoming damaged.

Also, since the setting/operating device 100 of Embodiment 1 does not have a structure in which an impact force is absorbed by using an elastic member as in the technology disclosed in PTL 3 described above, input and output characteristics of the setting/operating device 100 would not vary depending on the torque, so that complication of the system configuration of the regulating valve as a whole may be prevented compared with the related art.

In other words, according to the setting/operating device 100 of Embodiment 1, the setting/operating device in which damage to the gears is substantially reduced is achieved while preventing complication of the system configuration of the regulating valve as a whole.

According to the setting/operating device 100 of Embodiment 1, the cut-off torque may be reduced more than if the output shaft 7 or the movable internal gear 6 were provided with the torque limit function, so that reduction in size of the setting/operating device 100 is achieved.

In addition, according to the setting/operating device 100 of Embodiment 1, a simple torque limit structure in which the projection portion formed on one of the first gear portion 41 and the second gear portion 42 is fitted into the concave portion formed on the other, and the cut-off torque is defined by a frictional force on the contact surface between the first gear portion 41 and the second gear portion 42 is employed. And, thus, manufacture of the planetary gear 4 is simplified and an increase in manufacturing cost of the setting/operating device 100 may be reduced. In addition, as described above, by integrally forming the plate 5a and the gear portion 5b as the fixed internal gear 5, further reduction of the manufacturing cost is enabled.

Embodiment 2

Figure 12:
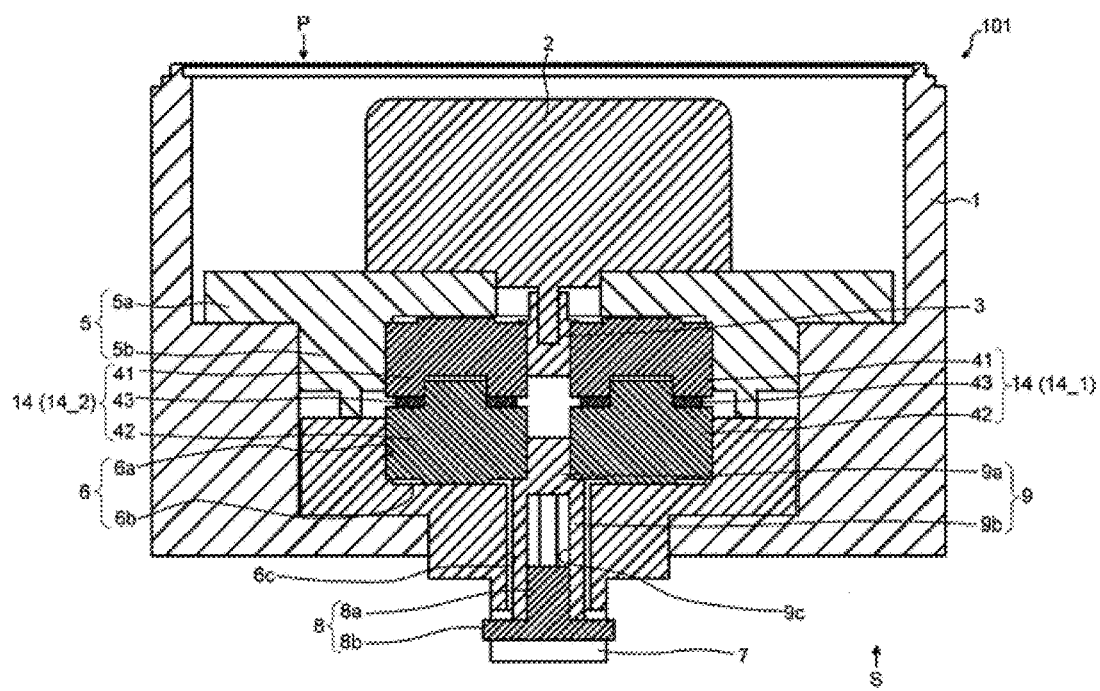
FIG. 12 is a cross-sectional view illustrating a principal portion of a setting/operating device according to Embodiment 2.

FIG. 12 is a cross-sectional view illustrating a principal portion of the setting/operating device according to Embodiment 2.

A setting/operating device 101 according to Embodiment 2 is different from the setting/operating device 100 of Embodiment 1 in that a friction member 43 is provided between the first gear portion 41 and the second gear portion 42, and other points are the same as the setting/operating device 100 in Embodiment 1. Among the components of the setting/operating device 101 of Embodiment 2, the same components as in the setting/operating device 100 according to Embodiment 1 are designated by the same reference numerals and detailed description will be omitted.

As illustrated in FIG. 12, a planetary gear 14 (i.e., planetary gears 14_1, 14_2, and 14_3) further includes the friction member 43 that couples the first gear portion 41 and the second gear portion 42 and generates a frictional force on contact surfaces with respect to the first gear portion 41 and the second gear portion 42. A specific structure of the planetary gear 14 will further be described in detail with reference to FIGS. 13 to 16 below.

Figure 13:
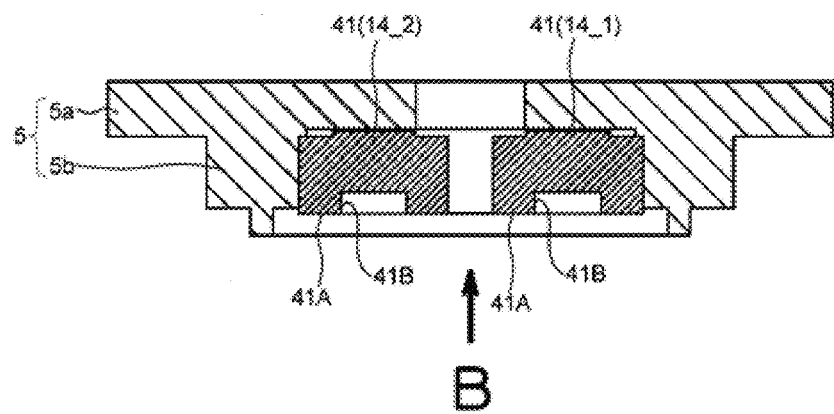
FIG. 13 is a drawing illustrating a cross-sectional structure of a first gear portion of the setting/operating device according to Embodiment 2.
Figure 14:
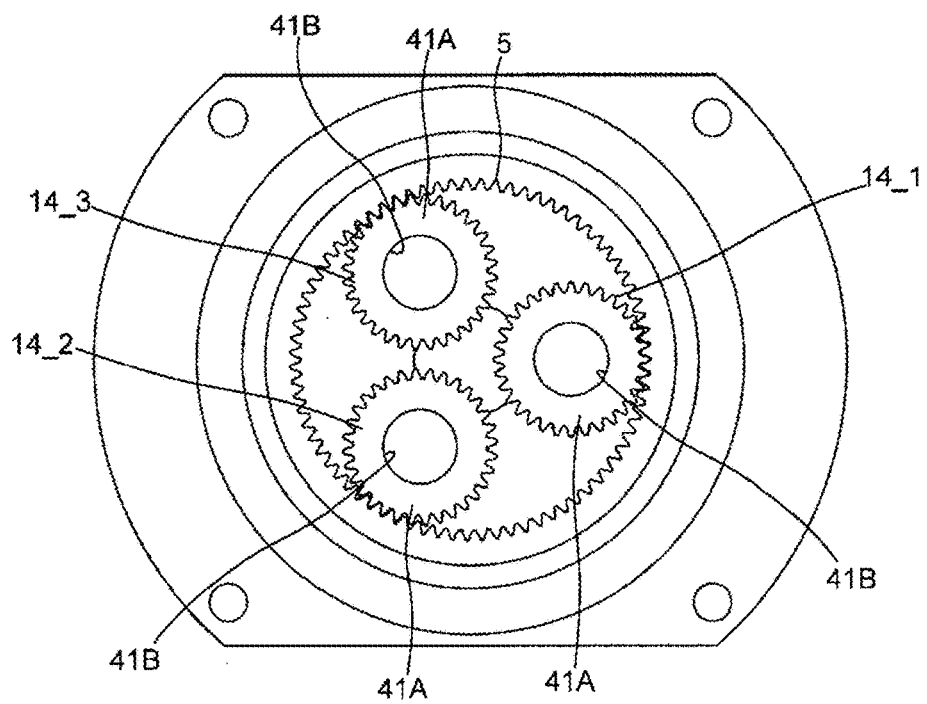
FIG. 14 is a drawing illustrating a planar structure of the first gear portion of the setting/operating device according to Embodiment 2.
Figure 15:
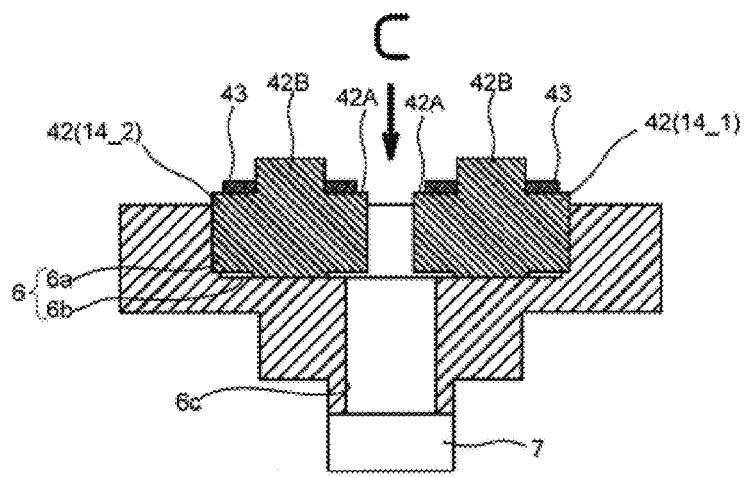
FIG. 15 is a drawing illustrating a cross-sectional structure of a second gear portion of the setting/operating device according to Embodiment 2.

FIG. 13 illustrates a cross-sectional structure in the periphery of the first gear portion 41 of the planetary gear 14, and FIG. 14 illustrates a planar structure of a portion in the periphery of the first gear portion 41 when viewing in a direction B in FIG. 13. FIG. 15 illustrates a cross-sectional structure in the periphery of the second gear portion 42 of the planetary gear 14, and FIG. 16 illustrates a planar structure of a portion in the periphery of the second gear portion 42 when viewing in a direction C in FIG. 15.

In FIGS. 13 to 16, only the portion in the periphery of the planetary gear 4 is illustrated and illustration of other portions in the setting/operating device 101 is omitted.

As illustrated in FIGS. 13 and 14, the first gear portion 41 includes a concave portion 41B formed on the surface 41A that comes into contact with the second gear portion 42 in a direction of the axis of rotation of the planetary gear 14. As illustrated in FIGS. 15 and 16, the second gear portion 42 includes a projection portion 42B formed on the surface 42A that comes into contact with the first gear portion 41 in a direction of the axis of rotation of the planetary gear 14.

Figure 16:
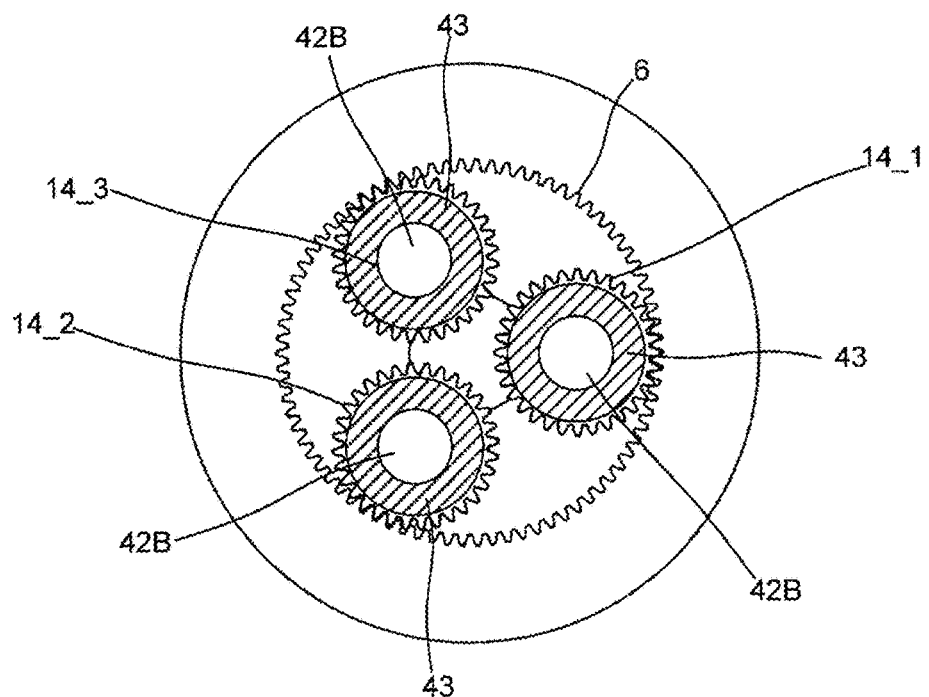
FIG. 16 is a drawing illustrating a planar structure of the second gear portion of the setting/operating device according to Embodiment 2.

Furthermore, as illustrated in FIGS. 15 and 16, the friction member 43 formed into a ring shape in plan view is placed in a peripheral portion of the surface 42A in the second gear portion 42, that is, in an area of the surface 42A other than the projection portion 42B.

As described above, the planetary gear 14 having a torque limit function is achieved by coupling the first gear portion 41 and the second gear portion 42 via the friction member 43.

Here, a cut-off torque of the planetary gear 14 may be defined by frictional forces on the contact surfaces of the friction member 43 with respect to the first gear portion 41 and the second gear portion 42. For example, with the configuration in which the first gear portion 41 and the second gear portion 42 are pressed against the setting/operating device 101 from above and below (from a direction S and a direction P), the cut-off torque may be defined by a frictional force of the contact surface between the surface 41A of the first gear portion 41 and the friction member 43 and a frictional force of the contact surface between the surface 42A of the second gear portion 42 and the friction member 43.

As described thus far, according to the setting/operating device 101 of Embodiment 2, the planetary gear 14 can be provided with the torque limit function as in the case of the setting/operating device 100 of Embodiment 1. And, thus, an impact force applied to each of the gears of the setting/operating device 101 may be alleviated, so that the teeth of each of the gears may be prevented from becoming damaged.

Also, according to the setting/operating device 101 of Embodiment 2, the cut-off torque is defined by a frictional force applied by the friction member 43, and thus easier adjustment of the cut-off torque to a desired value is achieved compared with the case where the cut-off torque is defined by the frictional force of the contact surface between first gear portion 41 and the second gear portion 42.

Embodiment 3

Figure 17:
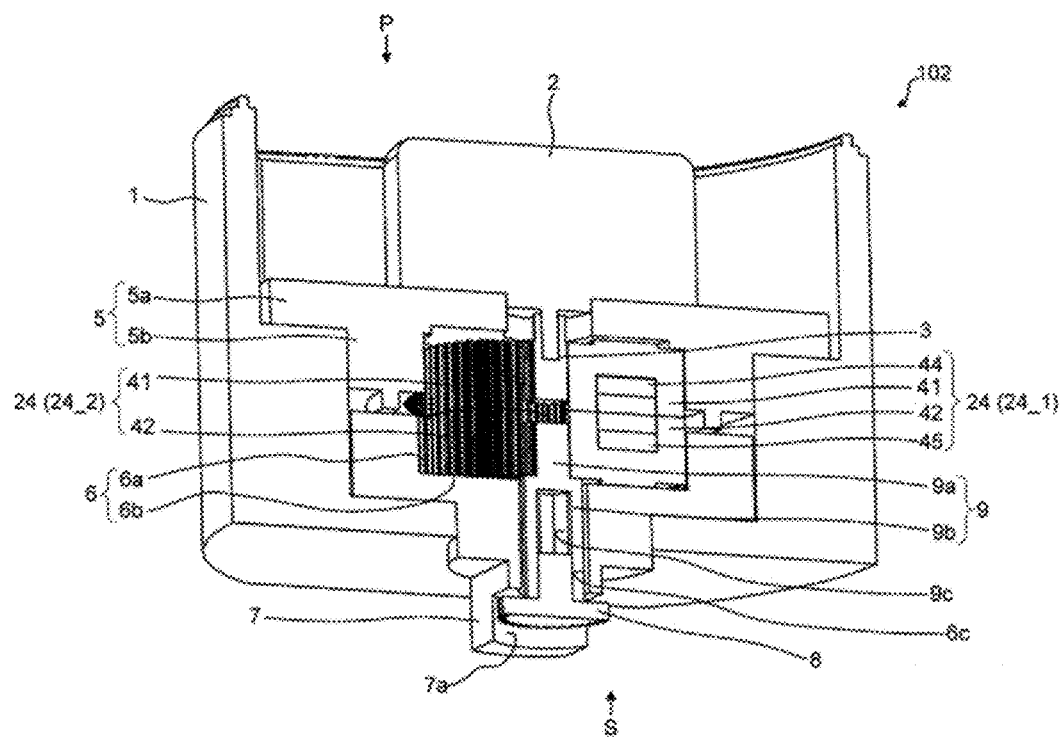
FIG. 17 is a cross-sectional perspective view illustrating a principal portion of a setting/operating device according to Embodiment 3.

FIG. 17 is a cross-sectional perspective view illustrating a principal portion of a setting/operating device according to Embodiment 3.

A setting/operating device 102 according to Embodiment 3 illustrated in FIG. 17 is different from the setting/operating device 100 of Embodiment 1 in that a cut-off limit of the planetary gear 24 (i.e., planetary gears 24_1, 24_2, and 24_3) is achieved not by the frictional force, but by a magnetic force, and other points are the same as the setting/operating device 100 of Embodiment 1.

Among the components of the setting/operating device 102 of Embodiment 3, the same components as in the setting/operating device 100 according to Embodiment 1 are designated by the same reference numerals and detailed description will be omitted.

Figure 18:
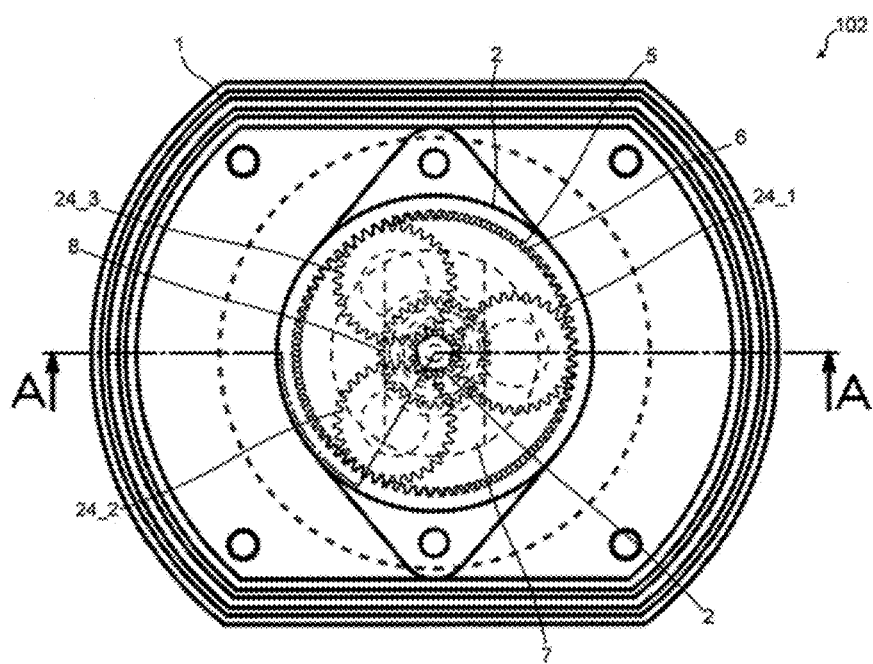
FIG. 18 is a plan view illustrating a principal portion of the setting/operating device according to Embodiment 3.

FIG. 18 is a plan view illustrating a principal portion of a setting/operating device according to Embodiment 3.

Figure 19:
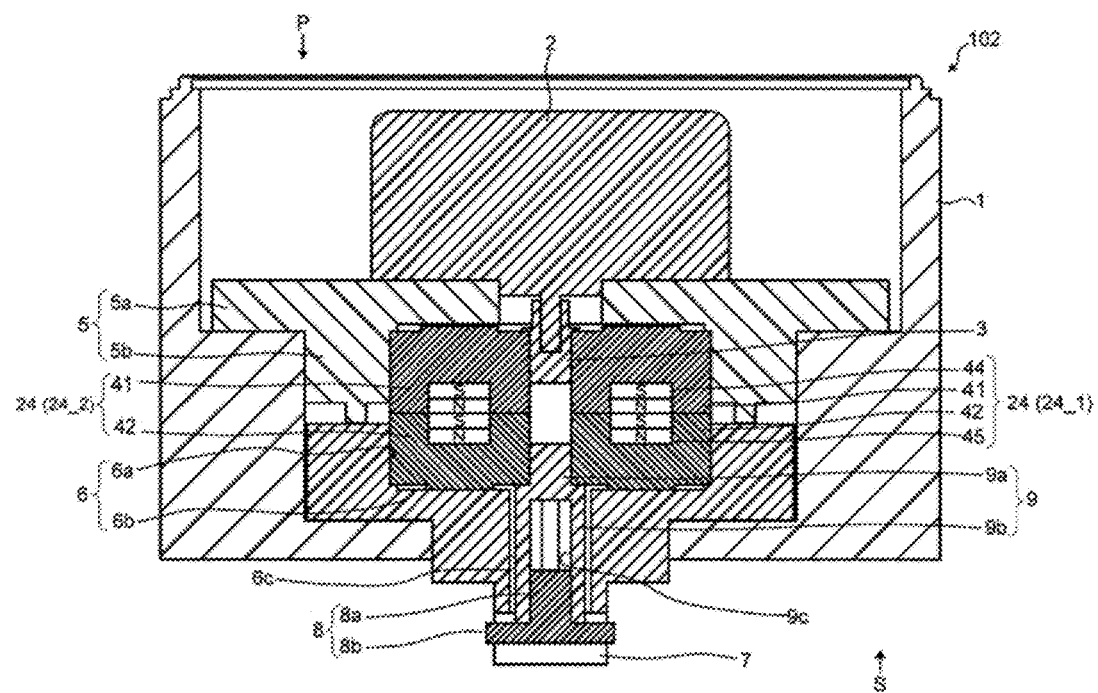
FIG. 19 is a cross-sectional view illustrating a principal portion of the setting/operating device according to Embodiment 3.

FIG. 19 is a cross-sectional view illustrating a principal portion of the setting/operating device according to Embodiment 3.

FIG. 18 illustrates a planar structure of a principal portion of a setting/operating device 102 when viewed from a direction P in FIG. 17, and FIG. 19 illustrates a cross section of the setting/operating device 102 taken along the line A-A in FIG. 18.

In FIGS. 18 and 19, part of the components of the setting/operating device 102 is omitted in order to clarify positional relationships among the gears which constitute a power transmitting mechanism of the setting/operating device 102.

As illustrated in FIGS. 17 to 19, a planetary gear 24 (i.e., planetary gears 24_1, 24_2, and 24_3) of the setting/operating device 102 includes the first gear portion 41, the second gear portion 42, a magnet 44 as a first magnetic field generation portion, and a magnet 45 as a second magnetic field generation portion. A specific structure of the planetary gear 24 will further be described in detail with reference to FIGS. 20 to 23.

Figure 20:
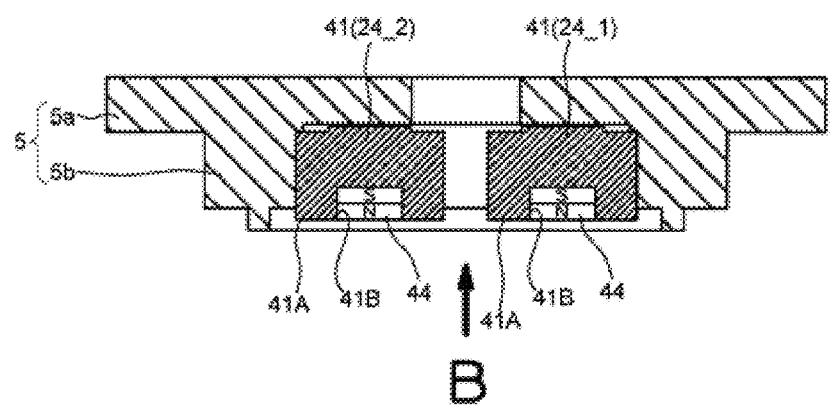
FIG. 20 is a drawing illustrating a cross-sectional structure of a first gear portion of the setting/operating device according to Embodiment 3.
Figure 21:
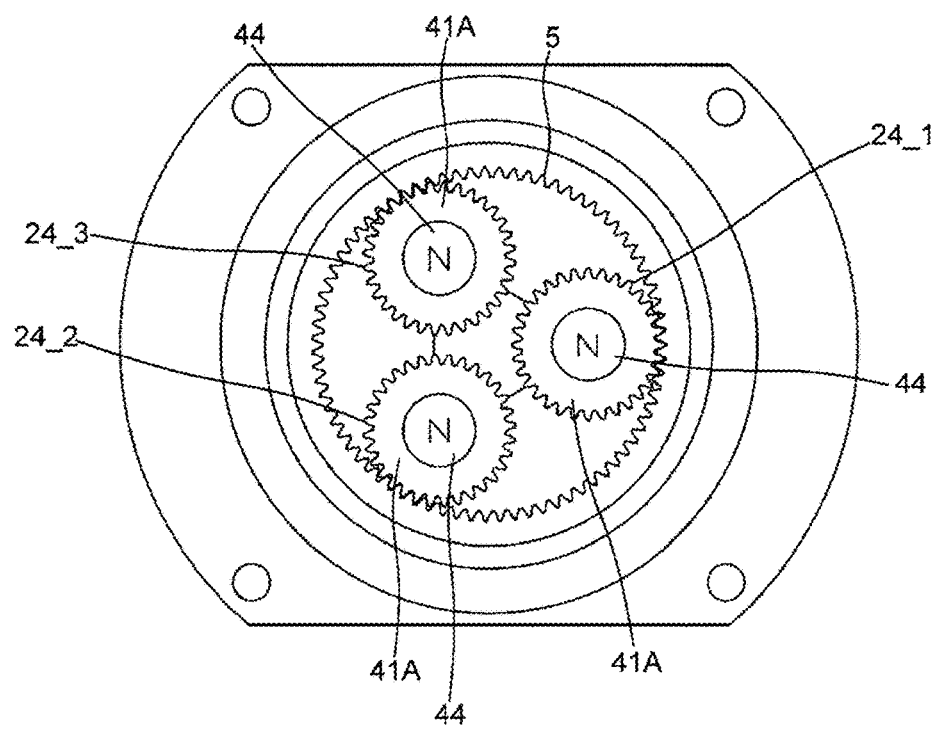
FIG. 21 is a drawing illustrating a planar structure of the first gear portion of the setting/operating device according to Embodiment 3.
Figure 22:
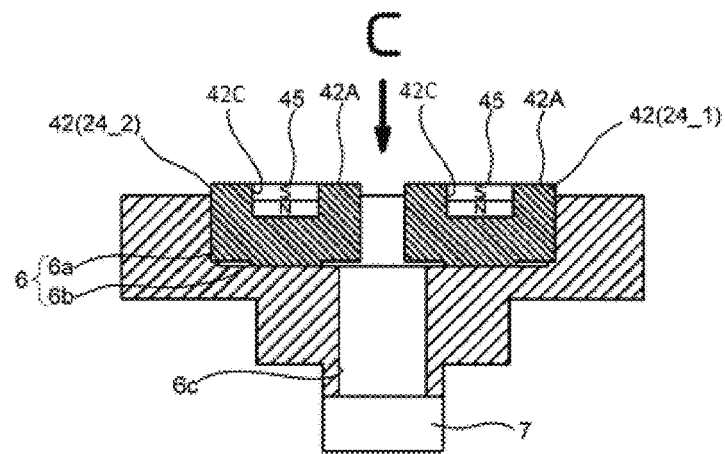
FIG. 22 is a drawing illustrating a cross-sectional structure of a second gear portion of the setting/operating device according to Embodiment 3.

FIG. 20 illustrates a cross-sectional structure in the periphery of the first gear portion 41 of the planetary gear 24, and FIG. 21 illustrates a planar structure of a portion in the periphery of the first gear portion 41 when viewing in a direction B in FIG. 20. FIG. 22 illustrates a cross-sectional structure in the periphery of the second gear portion 42 of the planetary gear 24, and FIG. 23 illustrates a planar structure of a portion in the periphery of the second gear portion 42 when viewing in a direction C in FIG. 22.

In FIGS. 20 to 23, only the portion in the periphery of the planetary gear 24 is illustrated and illustration of other portions in the setting/operating device 102 is omitted.

As illustrated in FIGS. 20 and 21, the first gear portion 41 includes a concave portion 41B formed on the surface 41A that comes into contact with the second gear portion 42 in a direction of the axis of rotation of the planetary gear 24. The magnet 44 is fixed to the concave portion 41B. For example, the magnet 44 is adjusted in height (a thickness in the same direction as P) so that the surface 41A of the first gear portion 41 and the surface of the magnet 44 are flush with each other when the magnet 44 is placed in the concave portion 41B.

Figure 23:
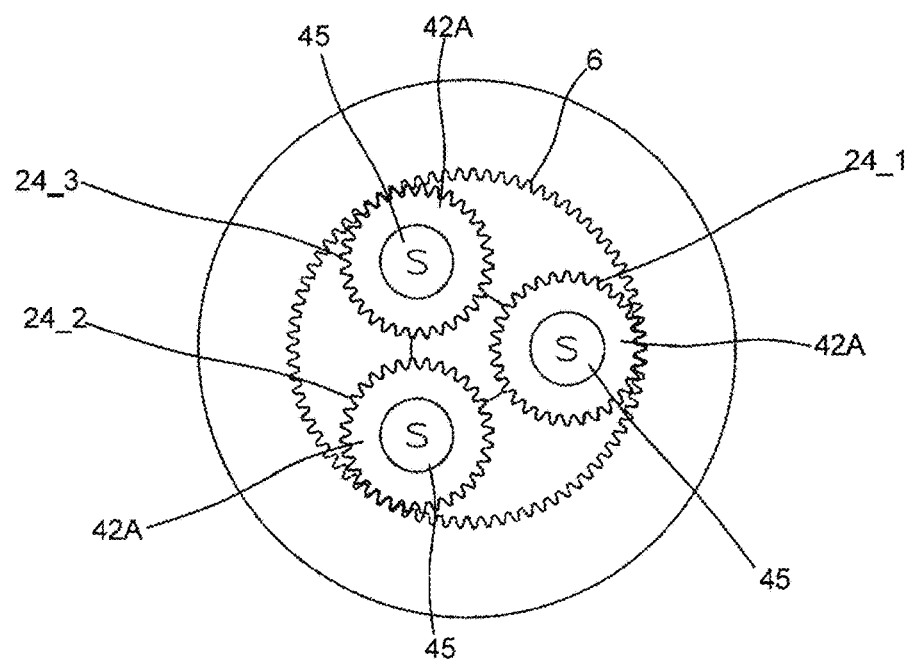
FIG. 23 is a drawing illustrating a planar structure of the second gear portion of the setting/operating device according to Embodiment 3.

As illustrated in FIGS. 22 and 23, the second gear portion 42 includes a concave portion 42C formed on the surface 42A that comes into contact with the first gear portion 41 in a direction of the axis of rotation of the planetary gear 24. The magnet 45 is fixed to the concave portion 42C. The magnet 45 is adjusted in height (a thickness in the same direction as P) so that the surface 42A of the second gear portion 42 and the surface of the magnet 45 are flush with each other when the magnet 45 is placed in the concave portion 42C. Here, as illustrated in FIGS. 19 to 23, the magnet 44 and the magnet 45 are disposed in such a manner that polarities (SN) of surfaces opposing each other are opposite.

With the first gear portion 41 and the second gear portion 42 configured as described above brought into contact with each other in the same axial direction, when a torsional moment exceeding a predetermined value is applied to one of the first gear portion 41 and the second gear portion 42, the planetary gear 24 having torque limit function in which the one idles with respect to the other is achieved. The cut-off torque of the planetary gear 24 is defined by a magnetic force between the magnet 44 and the magnet 45.

According to the setting/operating device 102 of Embodiment 3, the planetary gear 24 can be provided with the torque limit function as in the case of the setting/operating device 100 of Embodiment 1, and thus the impact force applied to each of the gears of the setting/operating device 102 may be alleviated, so that the teeth of each of the gears can be prevented from becoming damaged.

Embodiment 4

Figure 24:
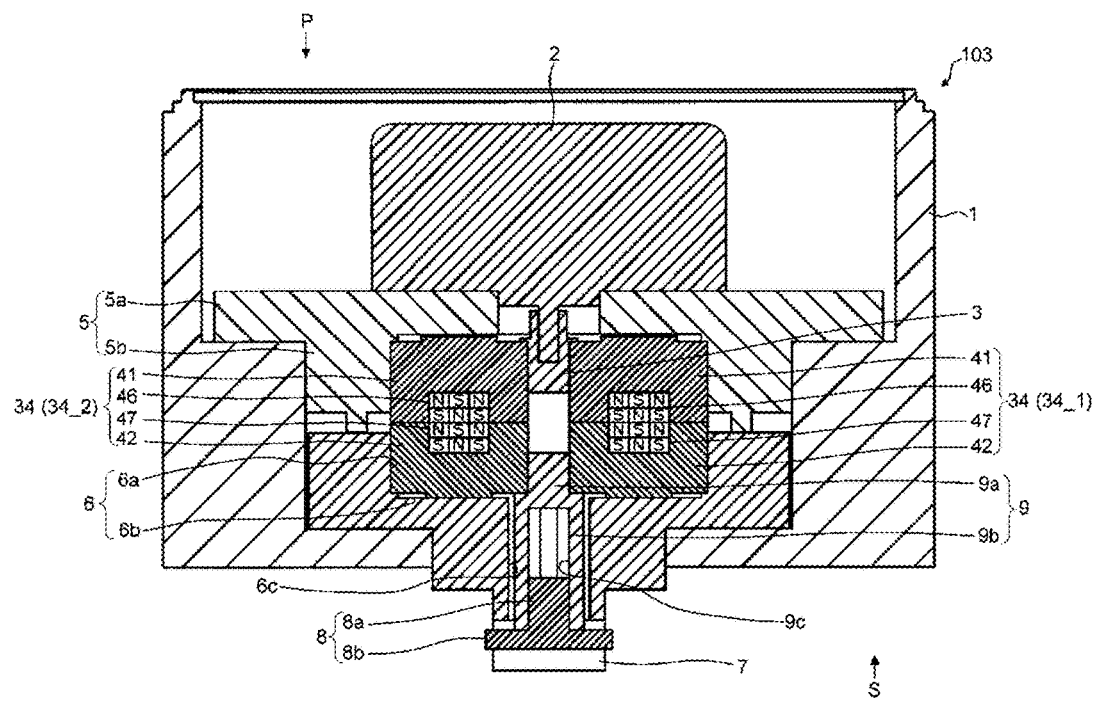
FIG. 24 is a cross-sectional view illustrating a principal portion of a setting/operating device according to Embodiment 4.

FIG. 24 is a cross-sectional view illustrating a principal portion of the setting/operating device according to Embodiment 4.

A setting/operating device 103 according to Embodiment 4 illustrated in FIG. 24 is different from the setting/operating device 102 of Embodiment 3 in that a torque limit function of the planetary gear 34 (i.e., planetary gears 34_1, 34_2, and 34_3) is achieved by a plurality of magnets for each of planetary gears 34_1, 34_2, and 34_3, and other points are the same as the setting/operating device 102 of Embodiment 3.

Among the components of the setting/operating device 103 of Embodiment 4, the same components as in the setting/operating device 102 according to Embodiment 3 are designated by the same reference numerals and detailed description will be omitted.

As illustrated in FIG. 24, a planetary gear 34 (i.e., planetary gears 34_1, 34_2, and 34_3) of the setting/operating device 103 includes the first gear portion 41, the second gear portion 42, a plurality of magnets 46_1 to 46_$n$ (n is an integer not smaller than 2) as the first magnetic field generation portion 46, and a plurality of magnets 47_1 to 47_$n$ as the second magnetic field generation portion 47. A specific structure of the planetary gear 34 will further be described in detail with reference to FIGS. 25 to 28.

Figure 25:
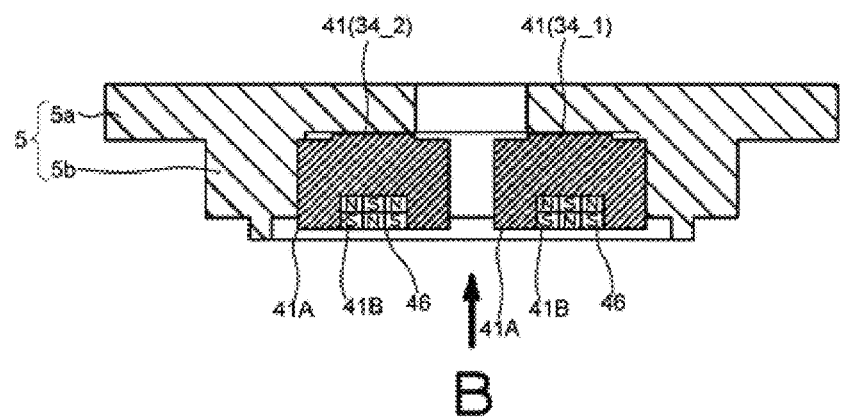
FIG. 25 is a drawing illustrating a cross-sectional structure of a first gear portion of the setting/operating device according to Embodiment 4.
Figure 26:
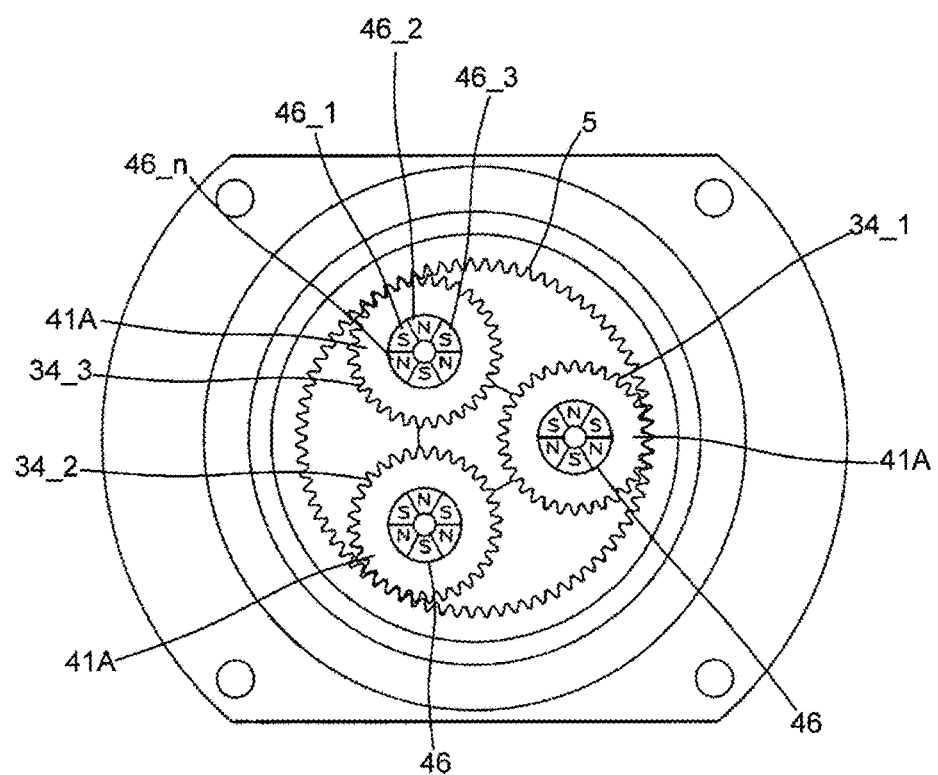
FIG. 26 is a drawing illustrating a planar structure of the first gear portion of the setting/operating device according to Embodiment 4.
Figure 27:
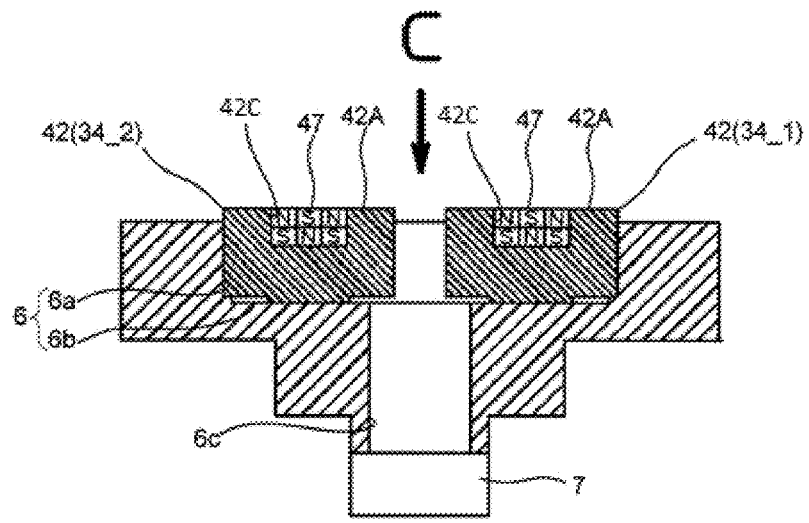
FIG. 27 is a drawing illustrating a cross-sectional structure of a second gear portion of the setting/operating device according to Embodiment 4.

FIG. 25 illustrates a cross-sectional structure in the periphery of the first gear portion 41 of the planetary gear 34, and FIG. 26 illustrates a planar structure of a portion in the periphery of the first gear portion 41 when viewing in a direction B in FIG. 25. FIG. 27 illustrates a cross-sectional structure in the periphery of the second gear portion 42 of the planetary gear 34, and FIG. 28 illustrates a planar structure of a portion in the periphery of the second gear portion 42 when viewing in a direction C in FIG. 27.

In FIGS. 25 to 28, only the portion in the periphery of the planetary gear 34 is illustrated and illustration of other portions in the setting/operating device 103 is omitted.

As illustrated in FIGS. 25 and 26, the plurality of magnets 46_1 to 46_$n$ (when expressing collectively, referred to as "magnet 46") are fixed to the concave portion 41B formed on the surface 41A of the first gear portion 41 for each of planetary gears 34_1, 34_2, and 34_3, which comes into contact with the second gear portion 42. Specifically, as illustrated in FIG. 26, the magnets 46_1 to 46_$n$ are placed with the polarities thereof directed alternately circumferentially of the first gear portion 41 in plan view. Also, the magnet 46 is adjusted in height (a length in the same direction as P) so that the surface 41A of the first gear portion 41 and the surface of the magnet 46 are flush with each other when the magnet 46 is placed in the concave portion 41B.

Figure 28:
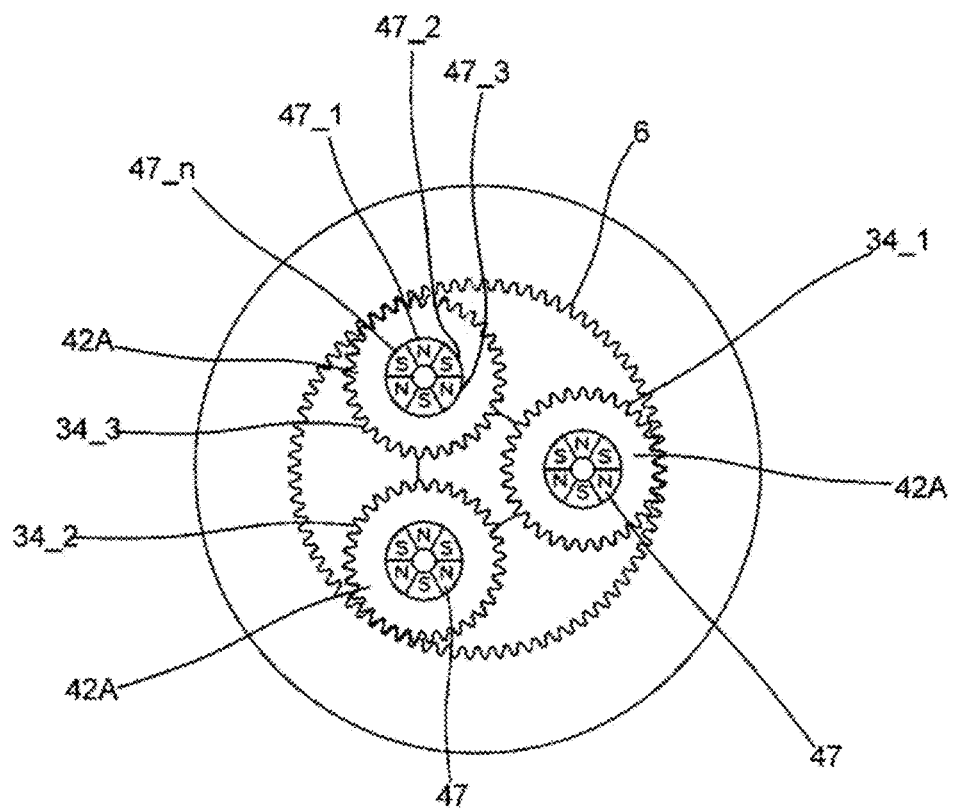
FIG. 28 is a drawing illustrating a planar structure of the second gear portion of the setting/operating device according to Embodiment 4.

As illustrated in FIGS. 27 and 28, the plurality of magnets 47_1 to 47_$n$ (when expressing collectively, referred to as "magnet 47") are fixed to the concave portion 42C formed on the surface 42A of the second gear portion 42 for each of the planetary gears 34_1, 34_2, and 34_3, which comes into contact with the first gear portion 41. Specifically, as illustrated in FIG. 28, the magnets 47_1 to 47_$n$ are placed along the circumferential direction of the second gear portion 42 with the polarities thereof directed alternately in plan view and opposite to those of magnets 46_1 to 46_$n$ at corresponding points of contact. The magnet 47 is adjusted in height (a length in the same direction as P) so that the surface 42A of the second gear portion 42 and the surface of the magnet 47 are flush with each other when the magnet 47 is placed in the concave portion 42C.

With the first gear portion 41 and the second gear portion 42 configured as described above brought into contact with each other in the same axial direction, when a torsional moment exceeding a predetermined value is applied to one of the first gear portion 41 and the second gear portion 42, the planetary gear 34 having torque limit function in which the one idles with respect to the other is achieved. The cut-off torque of the planetary gear 34 is defined by a magnetic force between the magnet 46 and the magnet 47.

According to the setting/operating device 103 of Embodiment 4, the planetary gear 34 can be provided with the torque limit function as in the case of the setting/operating device 100 of Embodiment 1, and thus the impact force applied to each of the gears of the setting/operating device 103 may be alleviated, so that the teeth of each of the gears can be prevented from becoming damaged.

Embodiments of the invention implemented by the inventors have been described specifically thus far. However it is needless to say that the invention is not limited thereto, and may be changed variously without departing from the gist of the invention.

For example, in Embodiment 2, the case where the ring-shaped friction member 43 is provided in a peripheral portion of the surface 42A of the second gear portion 42 has been exemplified. However, a friction member may be provided between a side surface of the projection portion 42B of the second gear portion 42 and a side surface of the concave portion 41B of the first gear portion 41 instead of the friction member 43, or in addition to the friction member 43 described above. In this configuration, the same effects and advantages as the setting/operating device 101 of Embodiment 2 are achieved.

Although the case where the dial 8 as one of the manually operating means is coupled to the manual operating gear 9 by a separate component has been exemplified in the embodiment described above, the invention is not limited thereto, and a configuration in which the dial 8 may be integrally formed with the manual operating gear 9 may be used.

Although the case in which the movable internal gear 6 and the output shaft 7 are formed integrally has been exemplified in Embodiments described above, the invention is not limited thereto, and a configuration in which these components may be formed as separate components and coupled to have the same axis of rotation may be used.

DESCRIPTION OF REFERENCE NUMERALS AND SIGNS

100, 101, 102, 103 . . . setting/operating device, 1 . . . housing, 2 . . . drive motor, 3 . . . sun gear, 4_1 to 4_3, 14_1 to 14_3, 24_1 to 24_3, 34_1 to 34_3, 4, 14, 24, 34 . . . planetary gear, 5 . . . fixed internal gear, 5*a* . . . plate, 5*b* . . . gear portion, 6 . . . movable internal gear, 6*a* . . . gear portion, 6*b* . . . bottom portion, 6*c* . . . through-hole, 7 . . . output shaft, 7*a* . . . concave portion, 7*b* cut-away portion, 8 . . . dial, 8*a* . . . projection, 8*b* . . . outer peripheral portion, 9 . . . manual operating gear, 9*a* . . . gear portion, 9*b* . . . supporting portion, 9*c* . . . hole, 41 . . . first gear portion, 42 . . . second gear portion, 43 . . . friction member, 44 to 47 . . . magnet, 41B, 42C . . . concave portion, 42B . . . projection portion

The invention claimed is:

1. A setting/operating device comprising:
a sun gear configured to rotate upon reception of a rotational force from a drive motor;
a fixed internal gear fixedly disposed to surround the sun gear and configured to have teeth on a fixed inner peripheral surface;
a plurality of planetary gears disposed between the sun gear and the fixed internal gear that rotates in engagement with the sun gear and the fixed internal gear while revolving around the sun gear;
a movable internal gear disposed coaxially with the fixed internal gear, said movable internal gear being configured with teeth on a movable inner peripheral surface that come into engagement with the planetary gears and being configured to be rotatable; and
an output shaft coupled to the movable internal gear and configured to rotate a valve stem of a regulating valve,
wherein each of the planetary gears comprises a torque limit structure that restricts power transmission between the sun gear and the movable internal gear when a torque of at least a predetermined value is applied to either of the sun gear and the movable internal gear in a direction of rotation, the torque limit structure comprising a plurality of magnetic field generation portions in proximity of one another at respective first and second contact surfaces of each planetary gear.

2. The setting/operating device according to claim 1, wherein the planetary gears each comprise:
a first gear portion that engages the fixed internal gear and the sun gear; and
a second gear portion coupled coaxially with the first gear portion and configured to engage the movable internal gear,
wherein the torque limit structure is configured between the first gear portion and the second gear portion such that when a torsional moment exceeding a predetermined value is applied to one of the first gear portion and the second gear portion, the one of the first gear portion and the second gear portion runs idle with respect to the other of the first gear portion and the second gear portion.

3. The setting/operating device according to claim 2, wherein the torque limit structure comprises:
a projection portion formed on one of the first gear portion and the second gear portion in a direction of an axis of rotation of the respective planetary gear, and
a concave portion formed on the other of the first gear portion and the second gear portion and allowing the projection portion to be inserted and fitted.

4. The setting/operating device according to claim 2, wherein
the plurality of magnetic field generation portions comprise:
a first magnetic field generation portion provided at the first contact surface of the first gear portion; and
a second magnetic field generation portion provided at the second contact surface of the second gear portion, said second magnetic field generation portion having an opposite polarity to the first magnetic field generation portion at a contact with the first magnetic field generation portion.

5. The setting/operating device according to claim 4, wherein
the first magnetic field generation portion comprises a plurality of first magnets placed circumferentially with alternating polarities in the first gear portion at the first contact surface, and
the second magnetic field generation portion comprises a plurality of second magnets placed circumferentially at the second contact surface with opposite alternating polarities to the plurality of first magnets at the contact with the first magnetic field generation portion.

* * * * *